US005370355A

United States Patent [19]

Rembold et al.

[11] Patent Number: 5,370,355

[45] Date of Patent: Dec. 6, 1994

[54] MAGNETIC VALVE

[75] Inventors: Helmut Rembold, Stuttgart; Ernst Linder, Mühlacker; Martin Müller, Asperg, all of Germany

[73] Assignee: Robert Bosch GmbH, Stuttgart, Germany

[21] Appl. No.: 966,045

[22] PCT Filed: May 25, 1991

[86] PCT No.: PCT/DE91/00436

§ 371 Date: Dec. 30, 1992

§ 102(e) Date: Dec. 30, 1992

[87] PCT Pub. No.: WO92/00479

PCT Pub. Date: Jan. 9, 1992

[30] Foreign Application Priority Data

Jun. 30, 1990 [DE] Germany ............................ 4020951

[51] Int. Cl.5 ........................ F16K 31/02; F16K 31/48

[52] U.S. Cl. ........................................ 251/64; 251/77; 251/129.19

[58] Field of Search ................ 251/77, 129.16, 129.17, 251/129.19, 64

[56] References Cited

U.S. PATENT DOCUMENTS

| | | | |
|---|---|---|---|
| 2,343,806 | 3/1944 | Scofield | 251/77 |
| 2,650,617 | 9/1953 | Wasser | 251/77 |
| 2,697,581 | 12/1954 | Ray | 251/129.16 |
| 2,827,923 | 3/1958 | Sadler | 251/77 |
| 2,980,139 | 4/1961 | Lynn | 251/77 |
| 3,575,199 | 4/1971 | Beattie | 251/129.17 |
| 3,995,813 | 12/1976 | Bart | 239/584 |
| 4,077,674 | 3/1978 | Doto | 251/129.17 |
| 4,183,000 | 1/1980 | Storez | 335/263 |
| 4,484,727 | 11/1984 | Harris | 251/77 |
| 5,123,626 | 6/1992 | Schlagmuller et al. | 251/129.17 |

FOREIGN PATENT DOCUMENTS

| | | | |
|---|---|---|---|
| 250120 | 3/1964 | Australia | 251/77 |
| 0128124 | 12/1984 | European Pat. Off. . | |
| 2171342 | 9/1973 | France . | |
| 2051166 | 8/1971 | Germany . | |
| 2262247 | 6/1974 | Germany . | |
| 2739085 | 3/1979 | Germany . | |
| 3406199 | 9/1984 | Germany . | |

*Primary Examiner*—George L. Walton
*Attorney, Agent, or Firm*—Michael J. Striker

[57] ABSTRACT

A magnetic valve for controlling a flow opening of a connection line for guiding fluid, particularly fuel, valve has a valve housing having a guide bore hole, a valve member displaceably supported in the guide bore hole and bringable into contact with a valve seat encircling the flow opening under the action of a closing force and also liftable from the valve seat under the action of an opening force, a coupling member transferring the closing force to the valve member. The coupling member is guided in the guide bore hole and has a damping collar with an end face which faces in direction of the valve seat and is bringable into contact with a contact surface provided in the valve housing and extending substantially parallel to the end face of the damping collar.

12 Claims, 1 Drawing Sheet

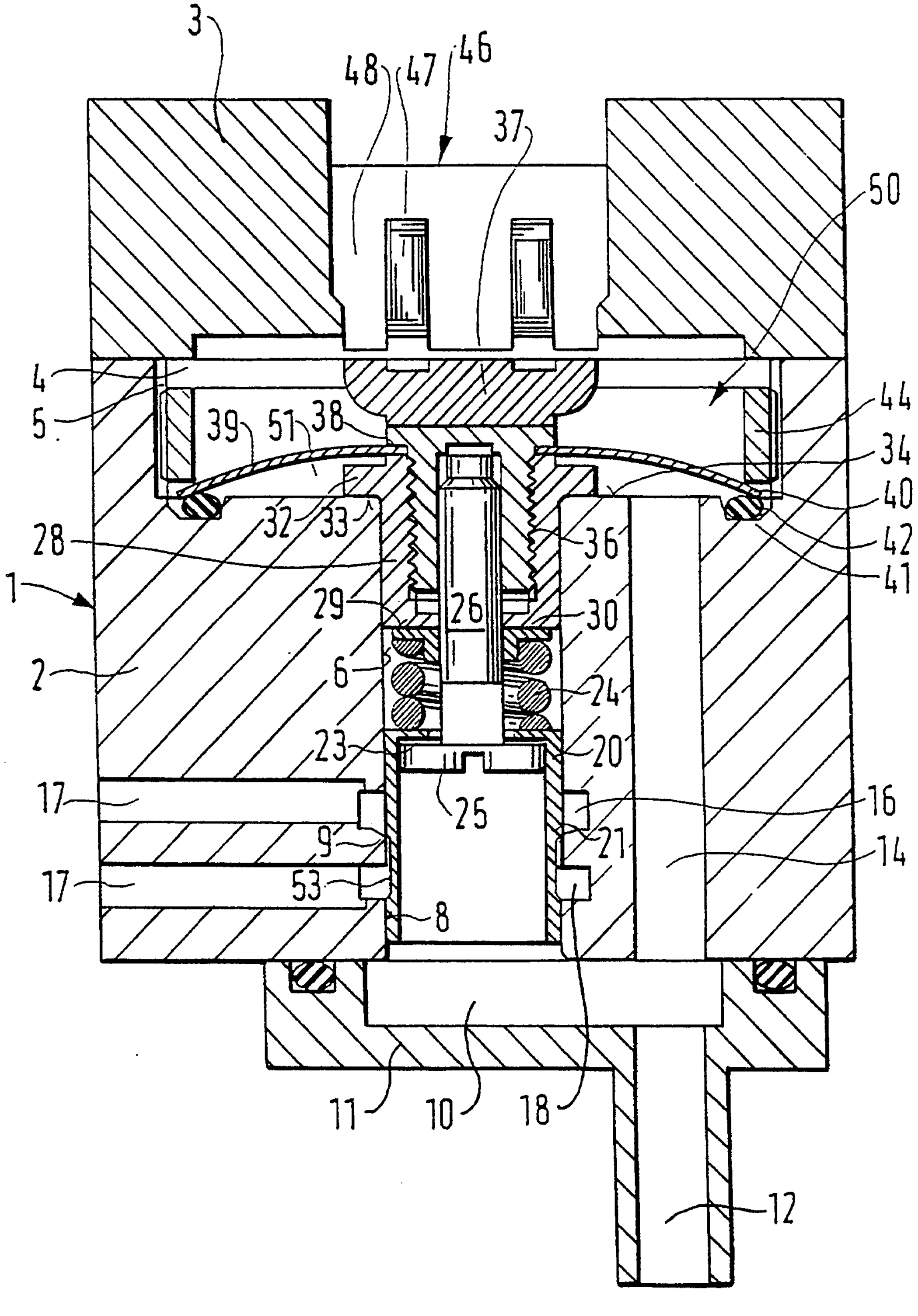
3
48
47
46
37
50
4
5
39
51
38
44
34
40
32
33
42
28
36
41
1
29
26
30
2
6
24
23
20
25
17
16
9
21
14
17
53
8
11
10
18
12

MAGNETIC VALVE

BACKGROUND OF THE INVENTION

The present invention relates to a magnetic valve for controlling a flow opening of a connecting line for guiding fluid, in particular fuel.

More particularly it relates to a magnetic valve which has a valve housing with a guide bore hole, and a valve member actuated by an armature of an electromagnet and displaceable in the bore hole so as to be brought in contact with a housing valve seat.

Magnetic valves of the above mentioned general type are known in the art.

In such a magnetic valve which is known from FR-A 2 171 342, the armature is constructed as a coupling member and has an axial pocket bore hole with a flanged edge at its outlet and holds a spring disk by this flanged edge as coupling member. The spring disk is acted upon by the coupling spring which is tensioned in the pocket bore hole. The valve member is acted upon axially in the direction of the coupling member by a return spring and is thus held in contact with the spring disk in such a way that the valve member follows the armature against a return spring when the armature or .coupling member is attracted. When the electromagnet is not excited, the armature is returned by the return spring and the valve member is pressed on a conical seat with its sealing surface. In a continued movement of the armature the spring disk of the coupling member can be lifted by the valve member from the flanged edge of the pocket bore hole in the coupling member against the force of the coupling spring. The coupling spring provided in this magnetic valve has a greater rigidity than the return spring and serves to compensate for a possible divergence in path between the armature and valve member and accordingly makes it possible to allow higher tolerances in the manufacture of the magnetic valve or different temperature expansions of the individual parts while still providing a high closing force.

A problem in fast-acting magnetic valves is that of the bouncing of the valve member after the valve closes. When such a magnetic valve is used in fuel injection pumps, a reopening of the valve member due to bouncing leads to unacceptably large fluctuations in the amount of injected fuel. Although the bouncing of the valve can also be ameliorated by the resilient coupling between the armature and the valve member known from the prior art in that a constant closing force takes effect at the moment that the valve member contacts its valve seat, such a valve is still in need of improvement. In particular, oscillating movements of the coupling spring can also occur in this valve.

SUMMARY OF THE INVENTION

Accordingly, it is an object of the present invention to provide a magnetic valve which avoids the disadvantages of the prior art.

In keeping with these objects and with others which will become apparent hereinafter, one feature of the present invention resides, briefly stated, in a magnetic valve in which a coupling member which transmits a closing force to the valve member and has a coupling spring is guided in the guide bore hole of the housing and has a damping collar whose end face facing in a direction of the valve seat can be brought into contact with a contact surface at the valve housing, which contact surface is situated parallel to the end face.

When the magnetic valve is designed in accordance with the present invention, it has the advantage over the prior art that the compressing process of the coupling spring is cushioned or damped by the collar after the supporting part is lifted from its stop so that the increase in force in the closing direction is effected with a delay immediately after the sealing surface of the valve member strikes against the valve seat and the tendency of the valve closing member to bounce is correspondingly further reduced.

The valve member has a short lift time during the opening movement because the armature and the coupling member have been pre-accelerated before the valve part is carried along. Accordingly, flow forces at the valve seat have little influence on the movement of the valve member and fluctuations in the amount of injected fuel are thus also slight.

A particularly advantageous construction is provided. When the shaft of a stop for a supporting part which is movable relative to a coupling member and together with the coupling member, is screwed together with the coupling member. In such a construction the supporting part is formed by the collar at the valve member in a simple manner. The valve member is accordingly rigidly coupled with the coupling member in the opening direction in an advantageous manner so as to ensure a reliable reopening of the valve when acted upon by the opening force. In accordance with another embodiment of the present invention, the guide bore hole serves to guide the valve member and the coupling member and opens into spaces which are connected with one another via a compensating bore hole and sealed relative to the electromagnet. With such a construction, the fluid portion can be separated from the electromagnet portion in an advantageous manner so that the fluid does not influence the operation of the electromagnet.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawings is a view schematically showing a magnetic valve in accordance with the present invention.

DESCRIPTION OF A PREFERRED EMBODIMENT

As can be seen in the drawings, an inventive magnetic valve has a valve housing 1 including two parts, namely a metallic valve block 2 and a cap 3 placed thereon. The cap covers a recess 4 in the end side of the valve block 2 which is provided with an internal thread 5, proceeding from which a guide bore hole 6 leads axially through the valve block. This guide bore hole 6 is constructed as a stepped bore hole with a stepped bore hole portion 8 of reduced diameter having a conical shoulder where it merges with the guide bore hole 6 so as to form a valve seat 9. The outlet of the stepped bore hole portion 8 from the valve block 6 opens into a collecting space 10 formed in a lower cover 11 which is tightly connected with the valve block 6, a leakage connection 12 leading away from the latter. The collecting space 10 is connected with the recess 5 via a compensating bore hole 14 situated parallel to the guide bore hole 6.

A fluid line 17 which can lead from a pump work space of a fuel injection pump, for instance, opens into the guide bore hole 6 via a first annular groove 16 in the guide bore hole wall on the side of the annular valve seat 9 toward the recess 4. Below this in the axial direction a second annular groove 18 is provided in the stepped bore hole portion 8, the continuing portion of the fluid line 17 leading away from the latter.

A valve closing member 20 of hollow-cylindrical construction is tightly displaceable in the guide bore hole 6. The valve closing member 20 has at its circumference an annular shoulder 21 with a sealing surface which can be brought into contact with the valve seat 9 in a tight manner. The hollow-cylindrical valve member is open toward the side of the collecting space and has an inwardly projecting collar 23 toward the side of the recess. The collar 23 is pressed by a coupling spring 24 on the head 25 of a screw 26 inserted into the valve closing member 20 from the side of the collecting space 10. The screw 26 is screwed into a coupling member 28 axially. The coupling member 28 is guided in the portion of the guide bore hole on the side of the recess so as to slide in a tight manner and its end side 29 facing the valve member inside the guide bore hole 6 contacts a spring disk 30 of the coupling spring 24 supported here. The depth to which the screw 26 can be screwed in accordingly defines the pretensioning of the coupling spring by which the latter holds the valve member 20 at the head 25 of the screw.

The coupling member projects into the recess 4 and has a cushioning or damping collar 32 whose end face 33 facing the valve member can be brought into contact with the end face 34 of the recess 4. The coupling member 28 is constructed from a plurality of parts and has an axial threaded pocket bore hole 36 entering from the side of the recess. An armature 37 is screwed into the threaded pocket bore hole 36 and in so doing clamps the inner edge 38 of a disk spring securely and tightly. The disk spring is coated with sealing material toward the side of the end face 34 of the recess 4. A spring disk with punched out spring arms can also be used instead of a disk spring and a sealing disk or diaphragm can be provided on the side of the spring or disk facing the valve member. The outer edge of the sealing disk or coated disk spring contacts an O-ring seal 41 embedded in a recess 42 in the end face 34. A ring screw 44 which is screwed into the thread 5 of the recess acts on the side of the outer edge 40 remote of the O-ring seal 41.

An electromagnet 46 with a coil 47 and a magnet core 48 is inserted in the cap coaxially relative to the guide bore hole 6 and cooperates with the armature 37.

The disk spring 39 or the sealing disk or diaphragm divide the recess 4 into a space 50 on the magnet side and a space 51 on the valve member side which is tightly sealed relative to the space on the magnet side so that leaking fluid, e.g. fuel, can be received by the latter and by the collecting space and can be discharged via the leakage connection 12. The electromagnet is accordingly kept free of fuel which can sometimes have a corrosive effect on the metal parts and could impair the operation of the electromagnet. The compensating bore hole 14 ensures the free movability of the spring and coupling member with the valve member 20. The end side of the core 48 is coated with a thin metallic layer so that there is a small resonance force regardless of that at the coercive field strength and a robust stop face is achieved at the magnet core.

The valve member 20 is held in the closed position shown in the drawing or brought into this closed position after the drop-off of the magnet by the disk spring which is stronger than the coupling spring 24. The valve member 20 is raised slightly from the head 25 so that the closing force of the disk spring 39 reaches the closing member 20 via the pretensioning of the coupling spring. To open the magnetic valve the winding 47 is excited and the armature 37 is accordingly attracted against the force of the disk spring 39 which is supported at the ring screw 44. During this process the collar. 23 of the closing member 20 contacts the head 25 again and is carried along by it together with the armature 37 and the coupling member 38 which is rigidly connected with the latter. The shoulder 21 of the valve member is then lifted from the seat 9 and enables a flow connection between the parts of the fluid line 17 via a circumferential recess 53 at the valve closing member 20 toward the side of the collecting space 10. In so doing, a substantial pressure compensation of the valve closing member is effected. To bring the magnetic valve into the closing position, the excitation of the electromagnet is interrupted and the disk spring 39 carries out the closing movement. In so doing, the coupling member 28 including the disk spring first moves in the closing direction together with the valve member 20 until the latter contacts the valve seat 9. In the following movement the collar 23 is lifted from the head 25 so that the coupling spring is compressed and the increase in closing force acting on the closing member is determined by the increase in the pretensioning of the coupling spring. In this region the damping collar 32 approaches the end side 34 so that the movement in the closing direction of the coupling member 25 is decelerated in a damped manner and the closing force is increased in a correspondingly damped manner until it achieves its final value when the damping collar 32 contacts the end side 34. A reliable closing of the magnetic valve is accordingly achieved and the valve member is prevented from briefly opening again due to the sudden application of force and accordingly bouncing back from the valve seat during the closing process. The moving mass is kept small by the resilient coupling between the coupling member 28 and the closing member 20 and therefore the damping surface at the damping collar 32 can also have sufficiently large dimensions. The damping is improved in that the space on the valve member side is filled with fuel so that the displacement by the damping collar 32 is opposed by a greater resistance than air, for example.

The restoring force of the disk spring 39 serves as closing force in the example discussed in the preceding. Embodiment examples are possible in which the magnetic force is used as closing force against an opening spring acting in the opening direction. The principle of the invention is illustrated with reference to the embodiment example and can be realized in different embodiment forms. For example, closing springs or opening springs and magnets can also be applied at different sides of the valve closing member in a corresponding variation of the construction. A disk spring tensioned in the opposite direction can act in the opening direction, for example, and an electromagnet in a turned around arrangement with axial actuating rod can act in the closing direction.

It will be understood that each of the elements described above, or two or more together, may also find a useful application in other types of constructions differing from the types described above.

While the invention has been illustrated and described as embodied in a magnetic valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A solenoid-actuated valve for controlling a flow opening of a connection line for guiding fluid, particularly fuel, the valve comprising a solenoid with an armature; a valve housing having a guide bore hole and a seat encircling said flow opening; a valve member having a shoulder provided with a sealing surface and being displaceably supported in said guide bore hole, said sealing surface of said shoulder being movable into contact with said valve seat under the action of a closing force and also movable from the valve seat under the action of an opening force impaired by said armature of said solenoid; a coupling member moved by said armature and further transmitting the closing force to said valve member, said coupling member having a stop; a supporting part which is moveable relative to said coupling member and together with said valve member can be brought into contact with said stop; and a coupling spring which has one side supported on a lower portion of said coupling member and another side supported on an upper portion of said supporting part, said coupling spring bringing said supporting part together with said valve member into contact at said stop and said support part with said valve member are lifted away from said stop when said valve member is seated on said valve seat in its closed position, said coupling member being partially guided in said bore hole and having an outside radially extending damping collar with an end face which faces in direction of said valve seat and is movable into contact with a contact surface in said valve housing and extending substantially parallel to said end face of said damping collar so as to decelerate movement of said coupling member in a closing direction in a damped manner and increase the closing force in a damped manner until it achieves its final value when said end face of said damping collar contacts said contact surface of said valve housing.

2. A magnetic valve as defined in claim 1, wherein said valve member has an opening, said stop having a shaft which is connected with said coupling member and a head which is guided in the opening of said valve member.

3. A magnetic valve as defined in claim 2, wherein said valve member is cylindrical and has an inwardly projecting collar, said coupling spring being bringable into contact with one side of said collar while said head of said stop being bringable into contact with another side of said collar.

4. A magnetic valve as defined in claim 3, wherein said shaft of said stop is screwed together with said coupling member.

5. A magnetic valve as defined in claim 1; and further comprising an electromagnet having an armature which actuates said valve member; and spaces connected with one another via a compensating bore hole and being sealed relative to said electromagnet, said guide bore guiding said valve member and said coupling member and being open into said spaces.

6. A magnetic valve as defined in claim 1; and further comprising an electromagnet having an armature; and a pretensioned spring arranged so that said closing force is generated by said pretensioned spring, said electromagnet providing said opening force which acts against said spring when said electromagnet is excited, said coupling member being formed as a part of said armature of said electromagnet.

7. A magnetic valve as defined in claim 6; and further comprising a space which is arranged on a side of said electromagnet and in which said guide bore hole is open, said spring being formed as a disc spring which tightly closes said space and is tensioned between said armature and said coupling member.

8. A magnetic valve as defined in claim 7; and further comprising a supporting part and a seal, said disc spring having an outer edge located between said supporting part and said seal.

9. A magnetic valve as defined in claim 7; and further comprising means for closing said space toward said electromagnet.

10. A magnetic valve as defined in claim 9, wherein said closing means is a sealing disc.

11. A magnetic valve as defined in claim 9, wherein said closing means is a diaphragm.

12. A magnetic valve as defined in claim 1; and further comprising a spring acting in an opening direction and an electromagnet acting in a closing direction, so that said closing force is generated by exciting said electromagnet which moves said valve member against the action of said spring.

* * * * *